UNITED STATES PATENT OFFICE.

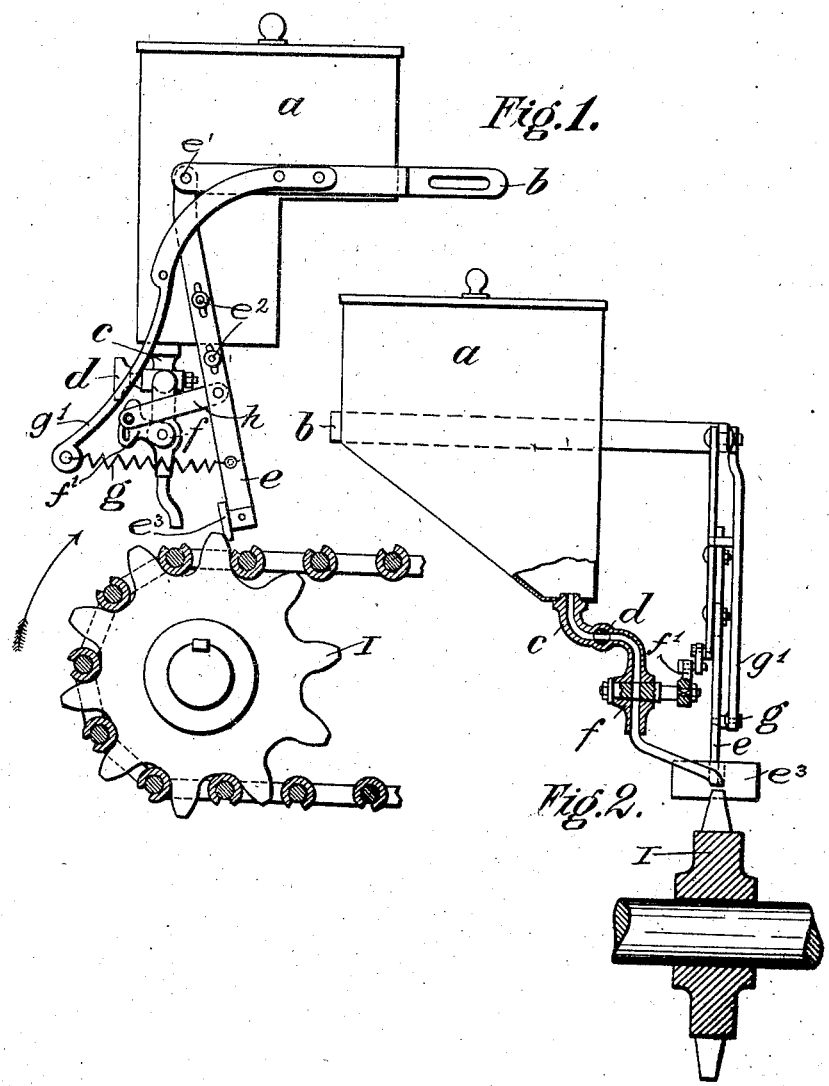

MAX KLEMM, OF BIELEFELD, GERMANY.

AUTOMATIC LUBRICATOR.

No. 840,345.   Specification of Letters Patent.   Patented Jan. 1, 1907.

Application filed March 5, 1906. Serial No. 304,297.

*To all whom it may concern:*

Be it known that I, MAX KLEMM, a subject of the German Emperor, residing at Bielefeld, in the Empire of Germany, have invented a certain new Automatic Lubricator, of which the following is a specification.

The invention relates to improvements in automatic lubricating devices, and is especially adapted for power-transmission mechanisms employing chains and sprocket-wheels.

The invention consists in the provision of a source of supply for the lubricant, which is so arranged with respect to the part lubricated as to provide a gravity-feed, devices being employed which coöperate with movable parts of the transmission mechanism, preferably the sprocket-wheel in such a manner as to control the feed of the lubricant and cause intermittent delivery thereof.

The invention will be more fully described in connection with the accompanying drawings and will be more particularly pointed out and ascertained in and by the appended claim.

In the drawings, Figure 1 is a side elevation of an automatic lubricator embodying the main features of my invention. Fig. 2 is a front elevation thereof with parts in section.

Like characters of reference designate similar parts in the different figures of the drawings.

As shown, $a$ designates a source of supply for the lubricant, which in the present construction consists of a closable receptacle. A pipe $c$, leading from the bottom of said receptacle, is provided between its ends with a valve $f$, carrying a slotted arm $f'$. A link $h$ connects said arm with a swing-arm $e$, pivoted at $e'$ in any suitable manner to a convenient stationary part, which, as shown, consists of a support $b$. Said arm $e$ is made in two parts, which, as shown, are adjustably connected at $e^2$ in order to lengthen or shorten said arm and vary the delivery of the lubricant, as will hereinafter more fully appear. The lower end of said arm $e$ carries an elongated engaging portion $e^3$, which projects into the path of and is adapted to be engaged by the teeth of the sprocket-wheel I. In order to normally maintain the valve $f$ in a closed position, I provide a contractile spring $g$, which is connected at one end with the arm $e$ and at the other end with an arm $g'$, which may be secured to any stationary part of the device, such as the support $b$.

Between the receptacle $a$ and the valve $f$ the pipe $c$ is provided with a valve $d$, which may be permanently closed and which is not under control of the devices effecting intermittent feed. It will be understood that when it is desired to throw the arm $e$ out of engagement with the wheel I it will merely be necessary to shorten the same, so that it will not project into the path of the teeth of said wheel.

It will be obvious from the foregoing that as the wheel I rotates the teeth will engage the elongated portion $e^3$ and force the arm to the right, serving to open the valve $f$, and that as the several teeth release the arm the spring $g$ will return the same to a retracted position and close the valve $f$, thereby effecting intermittent feed to the chain-wheel. The adjusting devices provided permit not only the adjustment of the arm $e$ to vary the length of time which the valve $f$ is open, but the slotted and adjustable connection of the valve-arm $f'$ and link $h$ affords additional adjusting means, whereby the degree of opening of the valve may be varied.

I claim—

An improved lubricating apparatus comprising in combination a receptacle for the lubricant, a pipe leading therefrom, a valve in said pipe adapted to permanently close or open the same, a second valve in said pipe adapted to be intermittently operated, a lever provided with a link adjustably connected with said last-mentioned valve, a toothed wheel adapted to engage said lever to intermittently operate the same, said lever being provided with an elongated engaging portion adapted to be successively engaged by said teeth, a spring connected with said lever and with a stationary part, and means for adjusting said lever to vary the movement of said last-mentioned valve.

In testimony whereof I affix my signature in presence of two witnesses.

MAX KLEMM.

Witnesses:
ANNA DIPPEL,
EMMA WHITE.